W. V. MEEK.
HARROW ATTACHMENT.
APPLICATION FILED MAY 28, 1914.

1,124,317.

Patented Jan. 12, 1915.

2 SHEETS—SHEET 1.

Inventor
W. V. Meek.

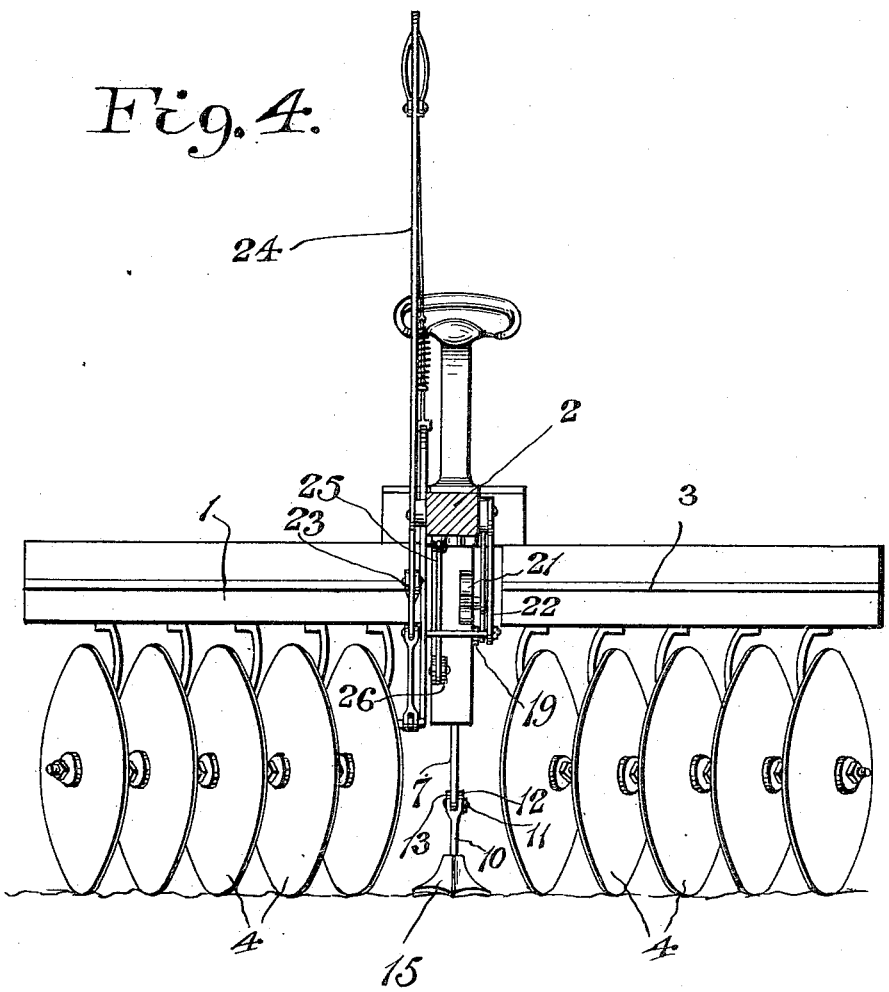

UNITED STATES PATENT OFFICE.

WILLIAM V. MEEK, OF OXFORD, KANSAS.

HARROW ATTACHMENT.

1,124,317.  Specification of Letters Patent.  Patented Jan. 12, 1915.

Application filed May 28, 1914. Serial No. 841,524.

*To all whom it may concern:*

Be it known that I, WILLIAM V. MEEK, a citizen of the United States, residing at Oxford, in the county of Sumner and State of Kansas, have invented certain new and useful Improvements in Harrow Attachments, of which the following is a specification.

This invention relates to attachments for disk harrows, and the primary object of the invention is the provision of a vertically adjustable shovel blade and means for attaching the shovel blade to the supporting frame of a disk harrow centrally thereof, so that the shovel will remove the ridge which is usually left between the meeting ends of the two sections of a disk harrow, and which will also tend to draw the corn stalks in front of the disks for cutting up, when the harrow is used for conditioning a cornfield for the planting of wheat or the like.

With the foregoing and other objects in view, this invention consists in such novel features of construction, combination, and arrangement of parts as will be hereinafter more fully described, illustrated in the accompanying drawings, and claimed.

In describing the invention in detail, reference will be had to the accompanying drawings, wherein like characters of reference designate like or corresponding parts throughout the several views, and in which:—

Figure 1:
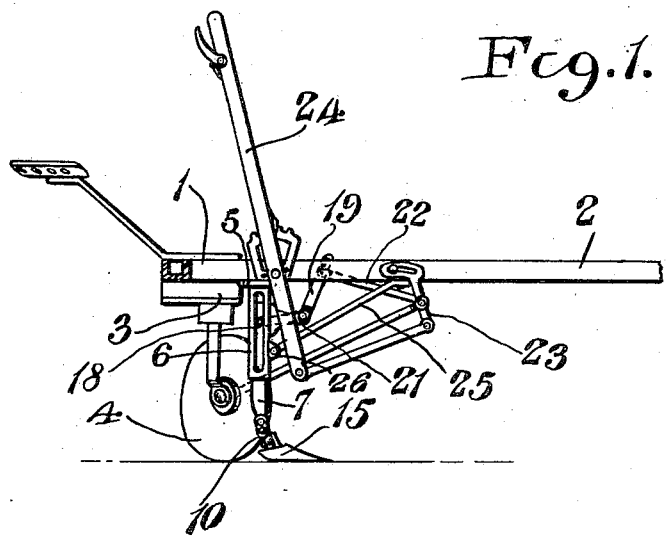
Figure 2:
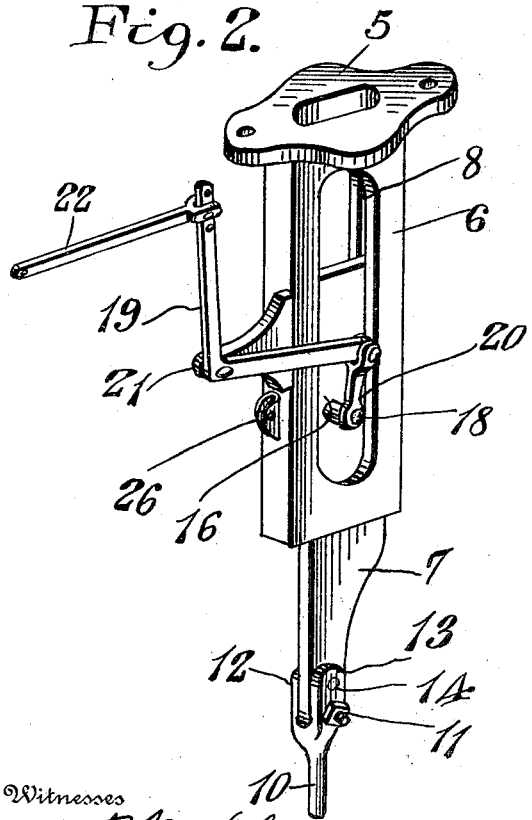
Figure 3:
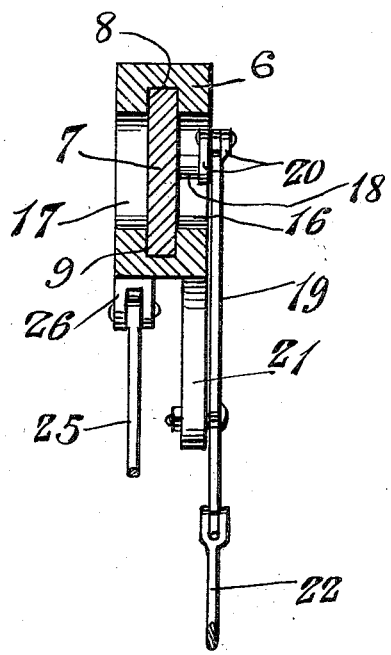

Figure 1 is a view of a fragment of a disk harrow showing the improved shovel or sweep attachment applied thereto, Fig. 2 is a detail perspective view of the shovel or sweep attaching means, and Fig. 3 is a cross sectional view through the shovel or sweep attachment. Fig. 4 is a front view partially in section of an ordinary disk harrow showing the improved attachment applied thereto.

Referring more particularly to the drawings, 1 designates an ordinary disk harrow, which has the tongue 2 formed thereupon, and the depending supporting brackets 3, for supporting the harrowing disks 4.

The tongue 2 of the harrow 1 has detachably secured to the under surface thereof, the base 5 of a guide way 6.

The guideway 6 has a plate 7 slidably seated therein, or in the longitudinally extending recesses 8 and 9 which are formed vertically in the inner edges of the guideway as is clearly shown in Fig. 3 of the drawings.

The lower end of the plate 7 is reduced in width and it has a plow attaching rod 10 connected thereto by a bolt 11, which extends transversely through the lower terminal end of the plate 7 and through the arms 12 and 13, which are formed by the bifurcation of the upper end of the rod 10.

The rod 10 is held against oscillatory movement upon the lower terminal end of the plate 7 by a break pin 14, which pin extends transversely through the arms 12 and 13 and through the lower end of the plate 7.

A sweep or shovel blade 15 is detachably mounted in the ordinary manner, upon the rod 10, and it is positioned so that the shovel blade 15 will be spaced between the meeting ends of the sections of the disk harrow, so as to cut away the ridge which is usually left between the meeting ends of the disk harrow when harrowing ground, and also for uprooting cornstalks or the like and throwing them sidewise in front of the disks where they will be cut up by the disks during the traction of the harrow.

The guideway 6 is provided with longitudinally extending openings 16 and 17 formed in its sides, and the opening 16 has extending therethrough a pin 18, which pin has linked connection with an angled lever 19 through the medium of the link 20.

The angled lever 19 is pivotally supported by a bracket 21, which projects transversely from one edge of the guideway 6, and it has a rod 22 connected to its upwardly extending free end.

The rod 22 is connected to a rod or lever 23, which is carried by the tongue 2, and which has connection with a hand lever 24, so that when the hand lever 24 is oscillated the plate or bar 7 will be moved vertically within the guideway, by the actuation of the angled lever 19 and the linked connection heretofore mentioned, for adjusting the elevation of the shovel blade 15 to suit conditions.

The guideway 6 is braced by a brace 25, which brace is secured to the tongue 2 in any suitable manner, and to the guideway 6 through the medium of transversely projecting ears 26, which are formed upon the guideway.

From the foregoing description, taken in connection with the accompanying drawings, the advantages of the construction and of the method of operation of the improved harrow attachment will be readily apparent to those skilled in the art to which this invention appertains, and, while in the foregoing the principle of the operation of this invention has been described, together with various features of construction, it is to be understood that certain minor features of construction, combination and arrangement of parts may be altered to suit practical conditions, provided such alterations are comprehended within the scope of what is claimed.

What is claimed is:—

1. The combination with a disk harrow having right and left harrowing sections, a supporting structure therefor, and a tongue, of a guideway secured to said tongue and depending therefrom, a plate vertically adjustable within said guideway and positioned intermediate of the meeting ends of said harrow sections and forwardly thereof, and a sweep blade detachably connected to the lower end of said adjustable plate.

2. The combination with a disk harrow having oppositely disposed harrowing sections, and a tongue, of a guideway pendently supported by said tongue, a plate vertically adjustable within said guideway, a shovel carrying arm pivotally connected to the lower end of said plate and held against pivotal movement by a break pin, a sweep blade detachably mounted upon said shovel carrying arm, and a plurality of levers connected to said plate for vertically adjusting said plate in said guideway.

3. The combination with a disk harrow having a plurality of harrowing sections and a lever mechanism for adjusting said harrow sections, of a sweep blade positioned intermediate the meeting ends of said harrow sections and forwardly thereof, means for pendently supporting said sweep blade, and means connecting said last named means and said disk actuating lever whereby the elevation of said sweep blade will be varied synchronously with the adjustment of said harrow sections.

In testimony whereof I affix my signature in presence of two witnesses.

WILLIAM V. MEEK.

Witnesses:
J. B. LOWRY,
D. C. LOWRY.

Copies of this patent may be obtained for five cents each, by addressing the "Commissioner of Patents, Washington, D. C."